United States Patent [19]

Farmont

[11] Patent Number: 4,800,803

[45] Date of Patent: Jan. 31, 1989

[54] VENTILATION DEVICE

[75] Inventor: Rolf Farmont, Düsseldorf, Fed. Rep. of Germany

[73] Assignee: Farmont Production GmbH & Co. KG, Düsseldorf, Fed. Rep. of Germany

[21] Appl. No.: 90,682

[22] PCT Filed: Nov. 5, 1986

[86] PCT No.: PCT/EP86/00637

§ 371 Date: Jul. 14, 1987

§ 102(e) Date: Jul. 14, 1987

[87] PCT Pub. No.: WO87/02945

PCT Pub. Date: May 21, 1987

[30] Foreign Application Priority Data

Nov. 15, 1985 [DE] Fed. Rep. of Germany ....... 3540546

[51] Int. Cl.$^4$ .............................................. B60H 1/26
[52] U.S. Cl. ..................................... 98/2.14; 98/900
[58] Field of Search .................. 98/2, 2.14, 2.15, 2.18, 98/90 D; 296/97 R, 96 G, 141, 143

[56] References Cited

U.S. PATENT DOCUMENTS 1,879,215  9/1932  Hammerl .......................... 296/143
4,558,634 12/1985 Oshiro et al. ........................ 98/2.18
4,633,769  1/1987  Milks ..................................... 98/2.14

FOREIGN PATENT DOCUMENTS 3003224  6/1981  Fed. Rep. of Germany ....... 98/2.18
3316823  8/1984  Fed. Rep. of Germany ....... 98/2.18
2543664  5/1984  France .................................. 98/2.18
  38109  3/1984  Japan ................................... 98/2.14
 521154  7/1976  U.S.S.R. .............................. 98/2.14
2057756  1/1981  United Kingdom .

Primary Examiner—Harold Joyce
Attorney, Agent, or Firm—Tarolli, Sundheim & Covell

[57] ABSTRACT

A ventilation device for a vehicle roof window disposed in a window opening having a light-permeable cover (6). The cover is adjustably movable between at least one open and one closed position. The ventilation device consists of at least one motor-driven fan (8, 4). At least one support (22, 24) can be fastened stationary on the vehicle body, for the arrangement of the fan on the vehicle interior side of the cover, within the window opening. A power source (14) is provided for the fan motor (8). The power source is at least one solar cell and this solar cell is arranged between the light-permeable cover (6) and the at least one support (22, 24).

7 Claims, 2 Drawing Sheets

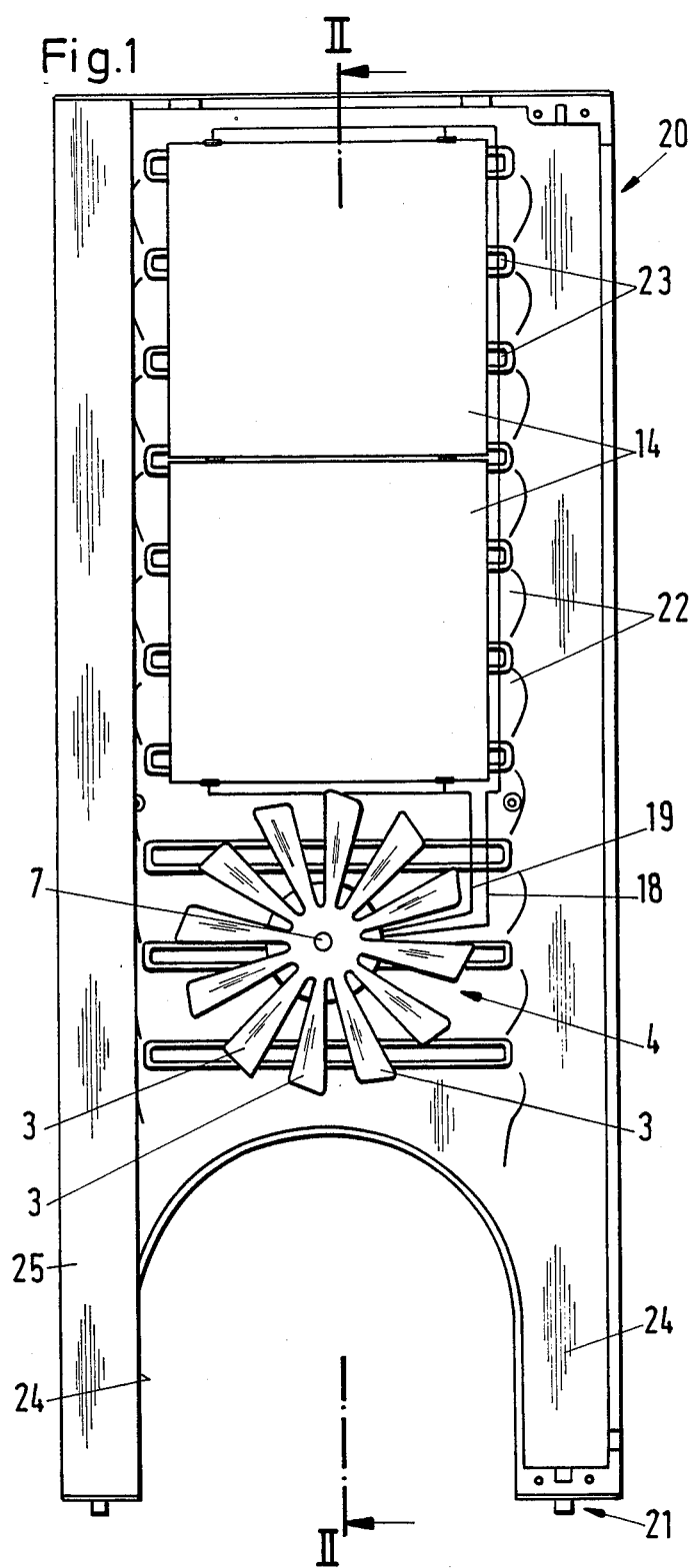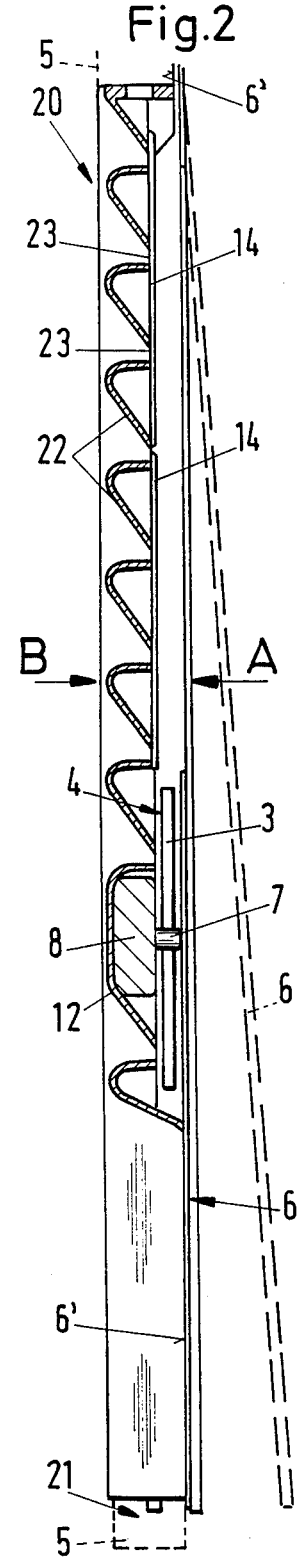

VENTILATION DEVICE

BACKGROUND OF THE INVENTION

1. Technical Field

This invention relates to a ventilation device for a vehicle roof window, and particularly to a sun roof which can be opened.

2. Description of the Prior Art

Vehicles which are not moving, moving relatively slowly, or are exposed to calm or only weakly blowing winds, are not cooled by relatively large masses of air flowing over them. The interior of the vehicle then heats up rapidly, especially in strong sunshine. This heat is oppressive to the body of a vehicle occupant; and cannot be greatly reduced, even by opening the window in the roof of the vehicle. By vehicle roof is understood here the whole zone of the vehicle body is provided with window surfaces, and especially the substantially horizontal roof surface. A certain remedy for such heating can be given by a ventilating blower or fan. But these ventilating blowers have, because of the very limited cross section dimensions of the ventilation ducts, through which relatively great amounts of air must be carried, the disadvantage of high power consumption, which greatly drains the battery which is generally used as a power source. When the vehicle is not running and the battery is not being recharged, these ventilating blowers cannot be used for long periods of time. Such ventilating blowers also have the disadvantage of producing local drafts, since the air exiting from the ventilator ducts must necessarily be concentrated in areas of the vehicle, or a great many air exits would have to be provided, which would cause difficulties in placing the ducts, as well as high costs.

In dwelling cars (mobile homes, campers) force-ventilated roof openings are provided in the roof, which in their closed position, through hidden ventilation slits, in the frame or in a hood-shaped cover, allow a constant exchange of air. To improve the exchange of air in such roof openings for mobile homes when the roof window is in the closed position, there has been proposed in German Disclosure No. 3,003,224, a motor-driven ventilator fan in the area of the openings for constant ventilation, which cannot be closed, is integrated into the hood of the roof opening, which can be opened. Such a hood is generally built as a double shell. It consists of a cover and a bottom shell, so that the heat-insulating effect of a double glazing is obtained. Here, either the space between the two shells forms the permanent ventilation duct, or the constant ventilation takes place through special ventilation slits in the rim of the hood, which form, with the frame of the opening, a watertight construction. With these known hoods which are actively force-ventilated in their closed position, the fan itself is fastened to the hood, which can be opened. The fan is fastened on the cover of the hood, if the force-ventilated air is conducted between the cover and bottom of the hood, or on the bottom of the hood, if a ventilation duct is provided running around the side of the hood rim. In the first case, the active force ventilation works only in combination with a double-shell roof hood. In the second case, the fan blades, borne on long stems, must be led through the surrounding ventilation channel, which must therefore be circular. In both cases, only with the roof hood closed is a sufficiently active forced ventilation of the vehicle obtained, since with the roof hood open, either the necessary high speed of air in the flow will lead to predominant flow of air from outside (in the first case), or because the fan blades, operating in near the rim of the opening, are effective only in the area of outside air. With the roof hood opened, therefore, only the outside air near the opening is circulated in the area of the opening itself, without the interior of the vehicle being either aired or deaerated. This disadvantage is tolerated, in the ventilation device known from German Disclosure No. 3,003,224, because there it is a matter of ventilated roof hoods, permanently in the closed position, for mobile homes. Another disadvantage of this known roof hood is the power consumption of the fan motor, which can be calculated in with the energy consumption plan of a mobile home.

From German Disclosure No. 2,943,970 is known a ventilation device of a different kind for force-ventilated roof openings of the kind mentioned. Accordingly, a ventilator, consisting of a fan motor and a fan wheel, is arranged on a stationary attachment support. This attachment support consists of hollow arms, tapering outward, through which the air, ejected by the fan, is fed to ventilation slits in the rim of the roof opening. This air conduction requires a relatively strong fan motor, and produces relatively high air speeds near the fan wheel, which are felt as drafts. The attachment support cannot be used for sun roofs for vehicles, which can be raised and/or pushed along, since sun roofs for vehicles could have no forced ventilation slits because their pane covers need to seal the outside environment from the inside of the vehicle.

SUMMARY OF THE INVENTION

Starting from this, the invention provides a ventilation device so the ventilation effect is improved, with windows, especially single-glaze, which remain open, especially of a sun roof which can be raised and/or pushed along.

According to a preferred embodiment of the invention, an attachment support is fastened stationary to the frame of the vehicle roof window. "Stationary", in the sense of the invention, means that the fan is not moved, in the opening and closing of the translucent cover of the sun roof. Thus, its position in the window opening is always retained. By a "fan", in the sense of the invention, is meant at least the element driving the ventilation stream, for example, a motor-driven fan wheel having one blade. The fan motor may, in principle, be arranged at a separate place in the vehicle roof, and the fan wheel driven by transmission, for example, but preferably, the motor drives the fan directly, and thus with no transmission, and will be held with the fan by the attachment support in the desired position of the window opening.

Through the invention, the following advantages, among others, are attained:

A ventilation effect, substantially uninfluenced by the definite opening position of the translucent cover, is attained.

The cover may, like any known window cover, be swung and/or pushed in any desired way, and/or removed, without being obstructed by the presence of the ventilator, which is of special importance, above all, for sun roofs which can be raised and/or pushed along, because of the limited space conditions.

With the use of the ventilation device, in combination with a single-glazed sun roof which can be raised and-/or pushed along, for the first time, an improvement of air conditioning is attained, even with the sun roof open, when outside air does not flow through the latter.

By designing a bearing element in the form of at least one attachment support, good air circulation is assured, while nozzle-like air passage openings between several attachment supports, forming one construction unit, promote the desired air circulation, while drafts are prevented, because the whole window opening is available for air exchange. It is also possible for the attachment support to have a lattice structure, which at best can even fill the whole window opening.

The attachment support, with the fan borne by it may be used as a complete unit in the window opening, in particular, detachable also, so that it is suitable both for simple removal and also for replacement, and the usual function of a window, especially the passage of light, is practically unimpaired.

By the fact that the energy source for the fan motor is at least one solar cell, arranged on the vehicle body, preferably fastened to at least one attachment support, the desired ventilation effect is quite decidedly improved, as compared with known ventilation devices. Namely, with strong sunlight, the need of forced ventilation is especially great. In this situation, relatively more electric energy is available to the fan motor than with less sunlight, with which the need of forced ventilation is less. Through the use of solar cells, an automatic regulation of the ventilation current is obtained, independent of special switches or sensors for temperature measurement or the like. For example, a fan wheel, driven by solar generated electricity, can turn more rapidly, with stronger sunshine and correspondingly higher vehicle heating, than with less sunshine and correspondingly lower vehicle heating. Another very important advantage of this ventilation device, driven by solar generated electricity, is the independence from any power source of the vehicle, especially the battery, so that the ventilation device can work in continuous operation, even when the vehicle is at rest and the battery is not recharging. Especially advantageous is the arrangement of at least one solar cell on at least one attachment support, which also carries the fan. This arrangement facilitates installation, especially in later equipping, in the window opening, and the removal of the ventilation device when not needed, for example, in the cold season, because neither wiring nor a special placing of the solar cell is necessary. Moreover, an advantage in ventilation technology is obtained, also, because one solar cell, at least, is arranged at the place where most of the sunlight-caused heat energy arrives into the interior of the car, namely, at a window surface, especially single-glazed, directly exposed to sunlight. By the arrangement of at least one solar cell behind this window surface, on the one hand, the "regulation performance" of the ventilation device is improved, because the more directly the sunlight acts on the interior of the vehicle, the more power the fan motor receives. On the other hand, in this way an especially favorable place is provided for the placing of the solar cells, since they are protected from weather and also have good efficiency. It will be understood that a ventilation device of this kind, with at least one solar cell, arranged on the vehicle roof, and especially in the window opening of the ventilated window, also brings very great ventilation advantages when the bearing element for the fan is fastened to the translucent cover itself, as, for example, in the roof opening hood described.

In principle, any known solar cells might be used for the ventilation device according to the invention, while a more exact description of the solar cells may be omitted, because these are sufficiently well known. Solar cells or solar cell arrangements have proved especially advantageous which have a slight thickness in comparison to the length and width of their light-sensitive surface. This may be accomplished, for example, by assembling a plurality of solar cells to a relatively thin plate. The light-sensitive surface of at least one solar cell is preferably arranged parallel to the plane of the window opening, in the area of the window opening itself. Through an arrangement of at least one solar cell between the translucent cover and at least one attachment support, the solar cell can be made not visible to the vehicle passengers.

When at least one attachment support has at least one radiation protection blind for the window opening fastened thereto, the air flow can be concentrated. The radiation protection blinds, partly covering the window opening, contribute also to the stream of air accelerated by the fan arriving in zones of the passenger space especially far from the window, because it reduces the amount of circulation in the area near the window. The arrangement of attachment supports in approximately the middle of the window opening has proved especially effective. An attachment support similar to that known from European patent application No. 85 104 805 is most suitable.

According to another embodiment of the invention, the feeding of power to the fan motor can be switched on and off, independently of the usual ventilation requirement, for example, when the vehicle is not in use for a long time, or the vehicle roof window is closed airtight and has no forced-ventilation slits. With the use of solar cells as source of power, by selective connection of the fan motor with the electrical system of the vehicle, in case of need, a forced ventilation independent of sunlight can be obtained.

Suitable embodiments of the subject of the invention which assure, in particular, a good ventilation effect with simple installation possibility and in combination with a visually pleasing design, are contained in the claims.

The above-mentioned parts to be used according to the invention are not subject, in their size, shape, material used and technical design, to any special exceptional requirements, so that the criteria of choice known in the particular field of use can be used without limitation.

BRIEF DESCRIPTION OF THE DRAWINGS

Other details, features and advantages of the subject of the invention are given from the description which follows of the respective drawings, in which is represented one preferred execution of a ventilation device according to the invention. In the drawings:

FIG. 1 shows a ventilation device in a view from outside the vehicle (view A according to FIG. 2);

FIG. 2 shows the same ventilation device in section along the line II—II of FIG. 1.

DESCRIPTION OF A PREFERRED EMBODIMENT

Figure 3:
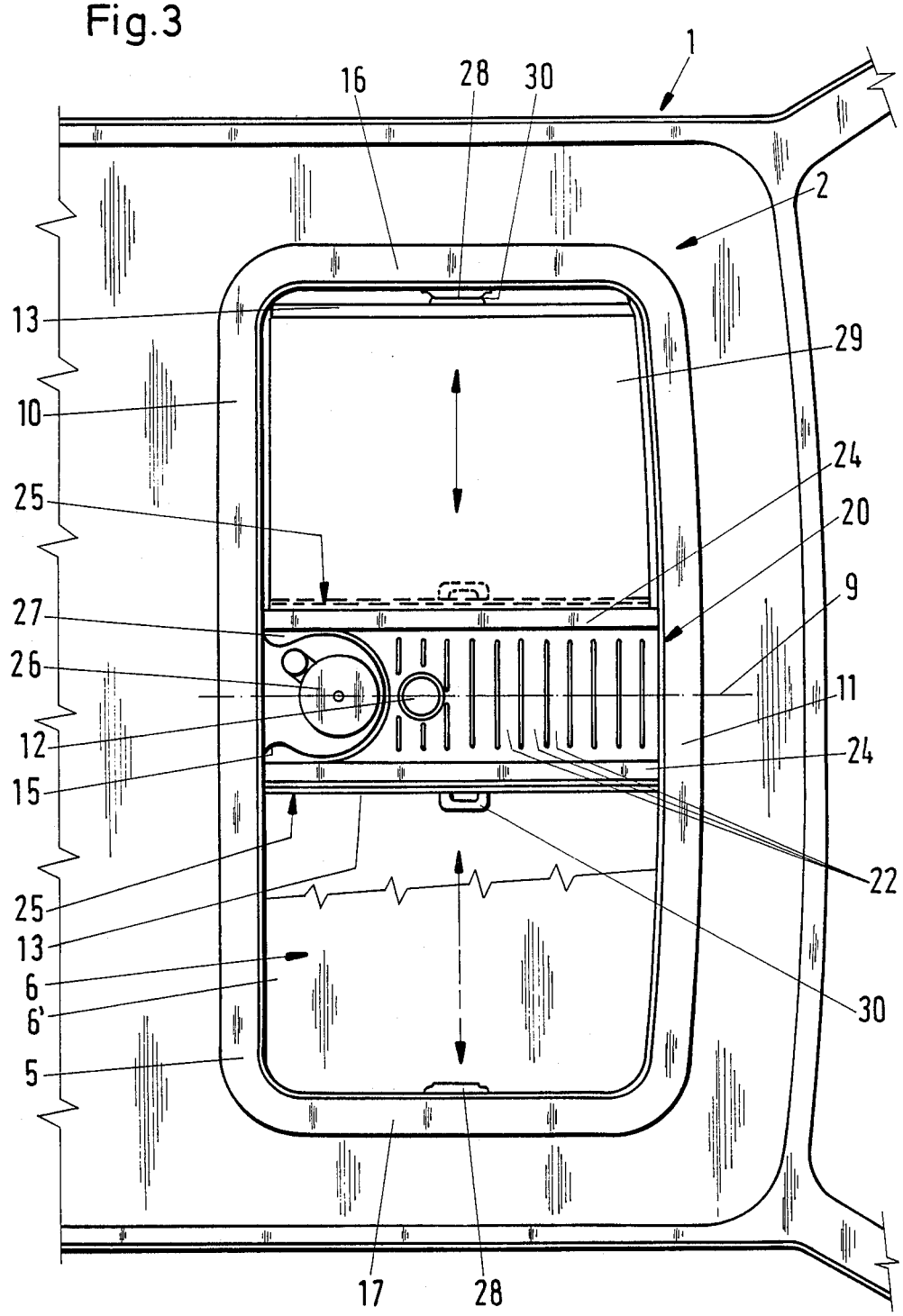
FIG. 3 illustrates the ventilation device, in an installed position, in a vehicle sun roof which can be raised (view B according to FIG. 2).

In the roof of a vehicle body 1 (FIG. 3), a window opening (roof opening) is provided with a sun roof 2.

The sun roof 2 is supported at the opening rim of the roof opening by a frame 5 and can be raised at the rear. The sun roof 2 has a translucent pane cover 6. On both sides of a longitudinal central axis 9 (in the direction of vehicle travel) of the sun roof 2 extends, in the travel direction, a bearing element 20, which is either made in one piece with the frame 5, or can be placed in and fastened. The bearing element 20 is a compact element extending between the front and rear supports 11, 10, of the frame 5. This is preferably done by means of a detachable catch connection with the said supports of the frame. The bearing element 20 consists of two attachment supports 24, extending on both sides of the longitudinal central axis 9, besides an actuation device 26 for the opening and closing of the cover 6. The attachment supports 24 are formed above as open housing shells, and receive a roll-up device 25 which extends outwardly from the attachment support. Sun blinds 29, which can be rolled up on the roll-up device 25, have, at their free lengthwise edges 13, eyelets 30. The sun blinds 29 can thus be fastened to the side frame supports 16 or 17, of the frame 5, by hook-shaped fastening elements 28.

Perpendicular to the attachment supports 24 of the bearing element 20, extend support members 22, arranged parallel with one another. Between the support members 22 are slit-form ventilation openings 23. Adjacent the actuation device 26 for the cover 6, joined at the holding socket 15 with the frame 5, is a relatively large area opening 27, provided between the attachment supports 24 and the support members 22 so that the cover 6 can be opened and closed without hindrance by the bearing element 20. The bearing element 20 has a flat lattice structure, which extends parallel with the window opening and inside the window frame. The cover 6 itself is a substantially flat, light-permeable plate, usually slightly arched, without appreciable projection upward at the rim. In its closed position, the cover 6 lies tightly against the frame 5, so that neither moisture nor air can enter through the roof opening. The cover 6 is located directly above the bearing element 20, as shown in solid lines in FIG. 2. When the cover 6 is in its open position, as shown in broken line in FIG. 2, an exchange of air can take place between the interior of the vehicle 1 and the outside. To this extent, the bearing element 20 with its roll-up devices 25 and the sun roof 2 are known from EP Pat. Appln. No. 85 104 805.

The bearing element 20 supports a motor-driven fan, which consists of a fanwheel 4 having blades 3. The fanwheel 4 is fixed to the drive shaft 7 of a fan motor 8. The fan motor 8 is relatively short and can be driven electrically. The fan motor 8 is located in a recess 12, formed by the support members 22.

The bearing element 20 also supports on its side facing the cover 6, two flat solar cell arrangements 14. Each of the solar cell arrangements 14 includes several solar cells, not shown in detail, and known per se. The solar cells are connected to a solar battery. The solar cells have the light-sensitive surfaces located facing the translucent cover 6. Wires 18, 19, represent an electro-conductive connection to the fan motor 8. In this way, the ventilation device shown in FIGS. 1 and 2, constitutes a compact, one-piece assembly, operating independently of the vehicle electrical system which can be removably attached to the frame 5.

The blades 3 of the fanwheel 4 may be transparent, in order to prevent the passage of flickering light through the ventilation openings 23. The cover 6 has, through a stamped imprint 6' or the like, known per se, a reduced light permeability, which is omitted in the zone of the solar cell arrangement 14, in order to assure as high as possible an energy yield to the solar cells. In this way, with corresponding dimensioning of the more light-permeable cover surface, the total visual impression of the cover is not impaired, since the more light-permeable surfaces are above the bearing element and the solar cell arrangement, and cannot be seen from the passenger space. To conceal the roller devices, not shown in FIG. 1 for greater clarity, and known per se, the attachment supports 24 may have, at the window side, a cover plate 25.

Having described a preferred embodiment of the invention, the following is claimed:

1. A sun roof for location in an opening in the roof of a vehicle and defining a window through which light and air are able to enter the vehicle interior, said sun roof comprising:
   frame means to be supported by the vehicle roof and defining the window including an unobstructed window area for the penetration of air and light therethrough;
   a translucent cover for the window including said unobstructed window area and movable between an open position in which air may enter the vehicle interior through the unobstructed window area and a closed position in which it blocks entry of air into the vehicle interior through the window;
   a ventilation device supported by said frame means and located in the window adjacent said unobstructed window area, said ventilation device comprising:
   fan blades,
   a motor for driving said fan blades,
   a support portion located under said translucent cover for supporting said motor and said fan blades on the vehicle interior side of said cover, said fan blades and said motor being spaced laterally away from said unobstructed window area, and
   a power source for said motor, said power source comprising at least one solar cell located between said translucent cover and said support portion;
   the area of said unobstructed window area being greater than the area of the window occupied by said ventilation device.

2. A sun roof as set forth in claim 1 wherein said one solar cell is mounted on said support portion.

3. A sun roof as set forth in claim 1 further comprising sun blind means located beneath said cover, said sun blind means comprising at least one sun blind and at least one roll-up device mounted on said support portion for rolling and unrolling said one sun blind.

4. A sun roof as set forth in claim 1 wherein said support portion extends along a middle line of the vehicle in a travel direction and defines ventilation slits therein extending transverse to the travel direction.

5. A sun roof as set forth in claim 1 wherein the light permeability of said translucent cover is greater in an area overlying said one solar cell than in the remaining areas of said cover.

6. A sun roof as set forth in claim 4 further including sun blind means comprising two sun blinds and two independently operated roller devices supported by said support portion on opposite sides of the middle line for rolling and unrolling said sun blinds in opposite directions transverse to the travel direction of the vehicle.

7. A sun roof as set forth in any of claims 1–6 wherein said support portion is detachably connected with said frame means.

* * * * *